UNITED STATES PATENT OFFICE.

WILLIAM E. CARSON, OF RIVERTON, VIRGINIA.

FERTILIZER.

1,082,108.

Specification of Letters Patent.  Patented Dec. 23, 1913.

No Drawing.  Application filed May 15, 1911. Serial No. 627,176.

*To all whom it may concern:*

Be it known that I, WILLIAM E. CARSON, a citizen of the United States, residing at Riverton, in the county of Warren and State of Virginia, have invented certain new and useful Improvements in Fertilizers, of which the following is a specification.

This invention relates to fertilizers; and it comprises as a composition of matter a mixture comprising fine ground limestone and fine ground caustic lime; all as more fully hereinafter set forth and as claimed.

For many soils the addition of lime for its fertilizing and chemical value is a necessity, and for most soils it is desirable. In the degradation of organic nitrogen compounds in the soil, putrefactive processes first form ammonia and amids and then these bodies are converted into nitrites and nitrates of lime, nitrate of lime being in the form available to the higher plants. For these reactions the presence of calcium carbonate is indispensable. Lime is also a necessary ash constituent of the higher plants. It is furthermore advantageous in correcting the acidity of soils and in producing certain advantageous changes in the physical character of the clay and other colloids of the soil. Lime is however an active body chemically, and the conditions under which it is applied to the soil are important.

In farming practice lime is applied either as such, that is, as caustic lime, in lump or in powder form; or as fine ground limestone. All these forms have disadvantages. Fine ground caustic lime, either as hydrated, that is, slaked lime, or as quicklime (which is at once hydrated by the moisture of the soil), when applied to the soil is diffused in solution in all directions, going some little distance before the carbon dioxid of the soil, air, and moisture convert it into the less soluble form of calcium carbonate. This tends to produce comparatively large local amounts of intimately commingled calcium carbonate in the soil which may act to "burn out" humus. Humus, which is an important constituent of all soils and is apt to be lacking in many, readily oxidizes and is lost in the presence of too much lime. This is a serious disadvantage of the use of powdered caustic lime since, for practical reasons, it is hardly possible to make a very small and very uniform application of such lime; neither is it often practicable to apply all the lime which an acre may need as a number of successive small applications. Lump lime is harder to apply uniformly and produces a greater local concentration of diffused lime, while much of any given lump is apt to be converted into calcium carbonate before it can diffuse at all. Fine ground limestone though soluble in soil moisture is too slowly acting in its diffusion; and gives no such immediate results as does quicklime.

In the present invention I have avoided the difficulties incident to the use of the described forms of lime and have secured certain new advantages by making an admixture of fine ground caustic lime and fine ground limestone. With a pulverulent mixture such as this, a minimal quantity of caustic lime can be evenly and thoroughly distributed over the ground, the limestone giving bulk and allowing the even distribution. Preferably both the lime and the limestone are very finely ground, say to pass a 60 mesh sieve, since the finer the lime the more easily it can be distributed through the limestone carrier and the less is the local excess of lime it can produce in the soil where it is applied. It is best to have the caustic lime slaked rather than present as quicklime since this avoids irregular hydration in the ground and insures that on contact with the soil moisture, the lime shall be ready to react with the ground water at once to form a solution without the chance of a prior carbonation which would impair the solubility. The lime may be slaked with an excess of water and mixed with the ground limestone as milk of lime, the mixture being afterward dried and ground. This gives an evener distribution and finer-particled character to the lime; but for most purposes a direct mixture of fine slaked lime and fine-ground limestone is sufficient. Quicklime may be slaked with just the amount of water necessary to convert it into dry hydrate; or with less. Or the quicklime may be ground dry and admixed directly with the ground limestone. It is better however to use dry-slaked lime, as caustic as may be; that is, as free as may be from absorbed carbon dioxid and resulting carbonate. Air-slaked lime is not desirable for the present purposes.

Any commercial caustic lime may be employed, but for the present purposes a rather lean lime carrying considerable magnesia is better than a fat lime running high in CaO. For neutralization, nitrification and some other purposes magnesia is as good as lime while it is much less caustic and it distributes better with the ground water. For although magnesium oxid and hydroxid are both very much less soluble than either quicklime or slaked lime, still the magnesium carbonate eventually formed is considerably more soluble than calcium carbonate, and hence more freely diffused through the soil. The higher plants require magnesia as well as lime and many soils are apt to be poor in this constituent. Magnesian limes are however not as well adapted for "flocculating" clay, and for exercising the chemico-physical action of lime on colloids generally. This however is not particularly important in many soils; and particularly in those of sandy or gravelly nature. Magnesian limes have a great advantage over purer limes in that they slake and dissolve less rapidly and do not have as much destructive action on the humus constituents of the soil. Consequently a limestone mixture under the present invention using magnesian lime may have more caustic lime present without detrimental effect than where purer lime is employed. With magnesian limes however since soil hydration is apt to be irregular it is generally necessary to have the lime carefully and regularly slaked prior to mixing with the ground limestone.

The proportion of lime to limestone may be as is necessary to fit any particular type of soils; but in general a mixture of say 25 to 50 per cent. caustic lime (best, hydrated lime) is suitable. A 25 per cent. mixture is applicable to any soil. It is always best to have the caustic lime a minor rather than a major fraction.

Taking a mixture of say 25 per cent. caustic lime (slaked) and 75 per cent. ground limestone, on application to the soil the lime begins to dissolve in the soil moisture and diffuses. Not enough of this solution can form in any one place to do material damage or form a local excess because the lime particles are too minute, and are separated and spaced apart by the limestone particles. This solution as it penetrates outward from its point of formation is carbonated and the lime becomes, relatively insoluble and deposits as fine, almost molecular particles of calcium carbonate. Calcium carbonate is much less soluble in water than caustic lime. It is however sufficiently soluble in soil water and rain water to insure that after the first deposition, it shall keep on spreading albeit more slowly. The limestone particles, which are calcium carbonate also, but in a relatively coarser, though absolutely fine, form do not yield as quickly to moisture; but they do dissolve slowly and as the fine particles deposited from the caustic lime are diffused and as they are taken up in nitrification, plant growth, neutralizing soil acids, etc., the supply from the limestone replenishes the soil. In other words, with the present mixture the caustic lime serves first to give an intimate impregnation of the soil with calcium carbonate in excessively fine readily available particles; but because of its small amount and its so to speak dilution with limestone no particle of soil can get an undue amount of caustic lime or calcium carbonate. The limestone which in itself is too slow acting, though its action is continuous over a long period because of its slow solubility, begins to act and replenish the supply of finely divided calcium carbonate when the very fine original carbonate from the caustic lime begins to disappear. The caustic lime acts first and then the limestone, the latter succeeding and supplementing the former. As to the chemico-physical effect on clay, that which is initiated and exercised by the caustic lime, is continued by the dissolving calcium carbonate from the limestone. The mixture of slaked lime and fine ground limestone has very convenient mechanical properties possibly because of some such chemico-physical action of the former on the particles of the latter as the former exercises on clay particles. With water it does not set and granulate as will a mixture of lime with most granular materials, hence it is easy to drill in, even if it has been exposed to moisture.

A convenient source of lime and limestone is the half-burnt lumps which may often be found, or which may be purposely produced, in the lime kiln. In these the particles of lime and of limestone are already well distributed among each other and simple grinding will produce a uniform mixture; a mixture which is perfected in a slaking operation. Air-slaked lime though containing calcium carbonate is not suitable for my purposes; partly because the air-slaking seems to produce a compound hydrocarbonate which does not act well in the soil, and partly because the calcium carbonate is generally in such an ultra-fine state of division that the regulable action I am seeking does not occur. With air-slaked lime there are no well defined stages of action.

While the limestone and the lime may be of the same origin and character, the lime being derived from burning the same limestone, yet they may be from different sources. Where they are from different sources, it is in general better to use the more magnesian limestones to furnish the caustic lime and the less magnesian limestone as such.

What I claim is:—

1. As a fertilizer, a pulverulent mixture of fine particles of natural limestone and fine particles of caustic magnesian lime.

2. As a fertilizer, a pulverulent mixture of fine particles of natural limestone and fine particles of hydrated caustic magnesian lime.

3. As a fertilizer, a pulverulent mixture comprising from about 25 to about 50 per cent. of hydrated caustic lime in fine particles admixed with fine particles of natural limestone.

4. As a fertilizer, a pulverulent mixture comprising from about 25 to about 50 per cent. of hydrated caustic magnesian lime in fine particles admixed with fine particles of natural limestone.

In testimony whereof, I affix my signature in the presence of witnesses.

WILLIAM E. CARSON.

Witnesses:
   A. O. HASSETT,
   C. A. STOKES.